April 20, 1965 L. L. MEYER 3,178,873
TOBACCO CUTTER AND SPUDDER
Filed Aug. 4, 1961 3 Sheets-Sheet 1

INVENTOR.
LESTER L. MEYER
BY
HIS ATTORNEYS

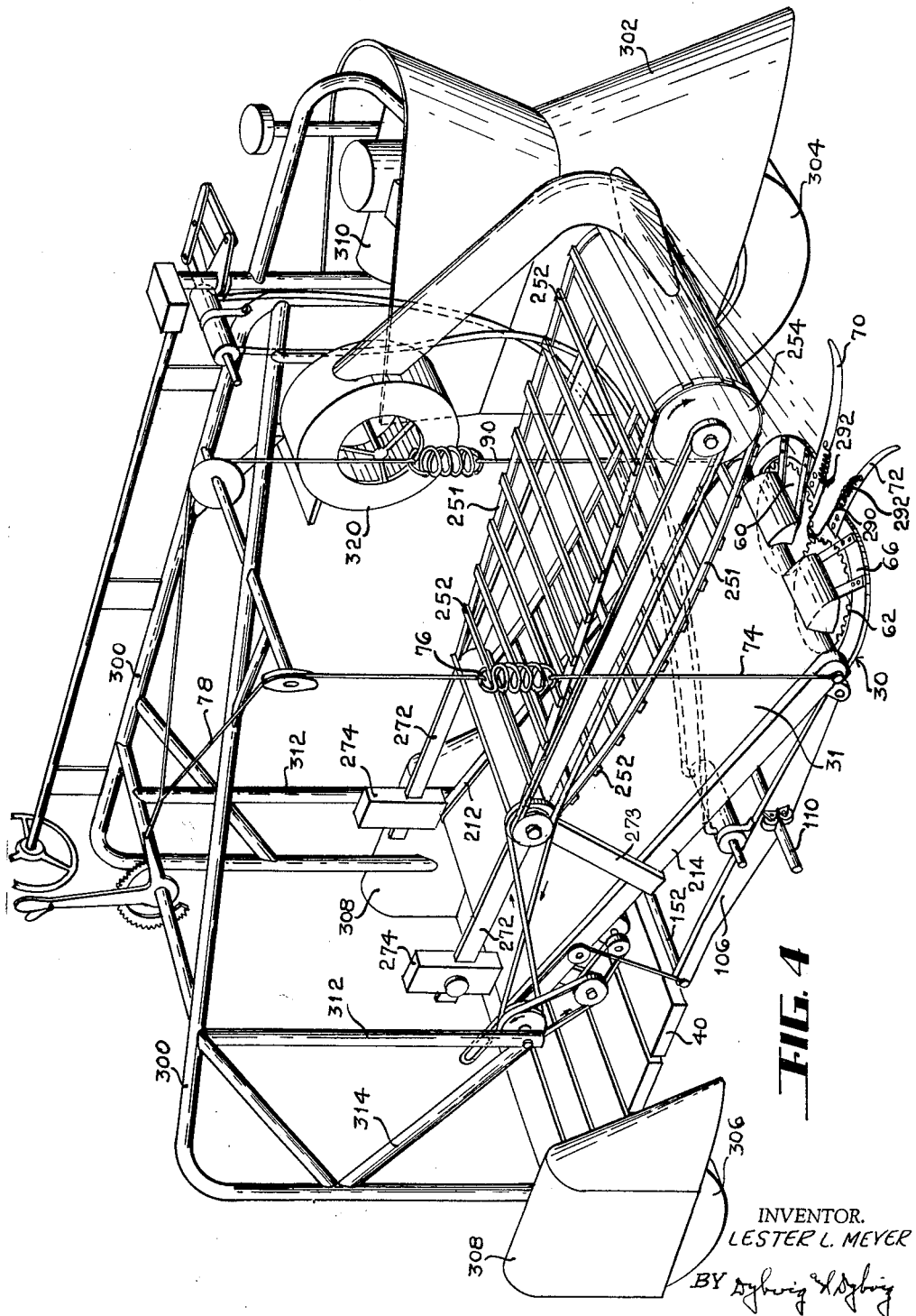

3,178,873
TOBACCO CUTTER AND SPUDDER
Lester L. Meyer, 120 W. George St., Arcanum, Ohio
Filed Aug. 4, 1961, Ser. No. 129,268
15 Claims. (Cl. 56—27.5)

This invention relates to a machine for cutting row crops, such as tobacco plants, which are planted in parallel rows, although this invention is not necessarily so limited.

The disclosure in this application is an improvement upon the Tobacco Cutter disclosed in Patent No. 2,933,875, issued April 26, 1960, to Lester L. Meyer and Robert L. Meyer.

In cutting or harvesting certain varieties of row crops, it is frequently desirable that the crops be harvested without mutilation of the leaves or other parts of the crop. The leaves of the tobacco plants are large and tender, easily injured when harvesting. In harvesting grain and similar crops, a reel is used to lay the cut crop on a conveyor. The conventional reels are usually manually adjustable to accommodate various heights of vegetation to be harvested.

The tobacco cutter in my patent cuts the tobacco plants and drops the cut plants in an orderly manner on the ground, utilizing air blasts to lay the cut plants. Usually, the plants are permitted to dry for a few hours in the hot sun, thereby removing moisture from the leaves. Before the tobacco plants are placed in storage in the tobacco drying sheds, the cut tobacco plants are spudded, that is, mounted on laths. The freshly cut tobacco plants have the laths extending through the lower or thick portion of the stems. This is easily accomplished by placing a spudder on the ends of a lath. This spudder is a spear-shaped steel member provided with a cavity, into which the end of the lath projects when spudding the tobacco. The spudder loosely fits on the end of the lath, so that it is easily removed as soon as the lath has been loaded. The spudder is then inserted on another lath and the operation repeated.

In the past, the job of spudding the tobacco plants in the field has been a back-breaking job, in that it was necessary to stoop down to pick up each individual plant, place it on the lath and then pick up the next plant, continuing this procedure until the lath was filled with plants.

An object of this invention is to provide a machine whereby the tobacco is cut and elevated to a suitable height so that two persons can spud the plants as they are delivered to the spudding station on the machine, where the cut plants are spudded as they are cut and before dropping to the ground. When a lath is filled, the lath and the spudded plants thereon are dropped on the ground to lie in the sun until towards evening, when the laths with the spudded plants thereon are loaded on a wagon or truck and hauled to the curing shed where the plants are suspended from the laths mounted on beams provided therefor.

Another object of this invention is to provide a reel mechanism for use in laying the cut tobacco in an orderly manner on a conveyor. This reel mechanism consists of a pair of belts mounted in spaced relation, having transverse reel members or slats attached thereto, the belts being mounted upon a floating support, so that as the machine travels along the row, the reel will automatically adjust itself to the height of the tobacco. For example, if there is a portion of a row that extends over poor ground, so that the tobacco is very short, the reel will automatically be lowered to the proper level, so as to properly handle the cut plants. When approaching higher tobacco plants, the reel is automatically raised to a higher level. This has been accomplished by the use of a balanced support that is pivotally mounted, so that only a slight force will raise the reel in response to the reel engaging taller plants by merely engaging the top tips of the plants. When approaching shorter plants, the reel automatically drops to a level where it will engage the top tips of shorter plants.

Another object of this invention is to provide cutters associated with guides which guide the lower end of the stems of the cut plants, so as to prevent the lower ends of the cut plants being carried sidewise by the rotary cutters.

Another object of this invention is to provide guard members used in shifting the cutters to follow the row and, at the same time, to steer the tractor used in propelling the tobacco cutter, so that the steered tractor automatically follows the row of tobacco.

Other objects and advantages reside in the construction of parts, the combination thereof, the method of manufacture and the mode of operation, as will become more apparent from the following description.

Figures 1, 2:
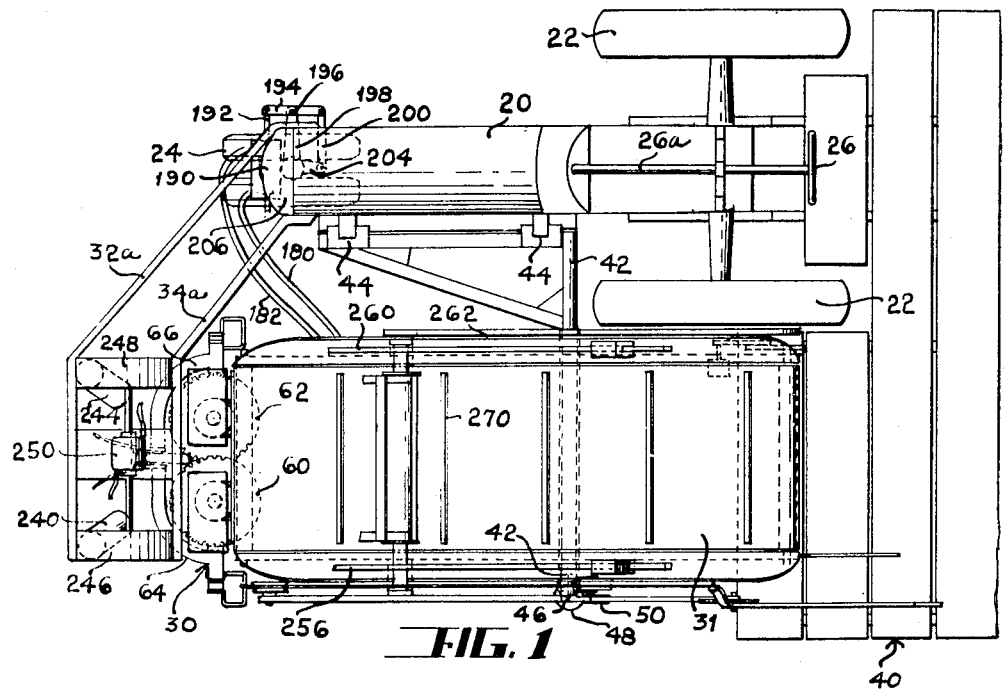
FIGURE 1 is a top plan view of one embodiment of the tobacco cutter and the elevator that have been mounted upon the side of a tractor.
FIGURE 2 is a side elevational view of the cutter, the elevator and the reel.

FIGURE 4 discloses a side elevational view in perspective of a modification, disclosing another type tractor supporting the cutter, the conveyor and parts associated therewith.

Referring to the drawings, the reference character 20 indicates a frame of a tractor having drive wheels 22 and either one or two steering wheels 24. This tractor may be steered manually by a steering wheel 26 or automatically by a steering mechanism that will be described more fully later.

Mounted on the side of this tractor is a tobacco cutter assembly 30 and conveyor or elevator 31. A pivotally mounted supporting frame structure 42 is pivoted at 44 to the side of the tractor frame and extends transversely of the cutter assembly 30 and conveyor 31 and terminates at 46, where it is connected to a tubular member 48 supporting a ground wheel 50. The wheel 50 and the member 48 raises and lowers the outer portion of the frame of the cutter assembly 30 and conveyor 31, to accommodate variations in the ground level. The entire frame structure for the conveyor is pivotally mounted upon the member 42.

*Tobacco cutter mechanism*

The tobacco cutter mechanism includes a pair of rotary discs or cutters 60 and 62. The margins of these wheels are serrated or toothed, so as to effectively cut the stems of the tobacco plants. Incidentally, the stems of the tobacco plants may be quite heavy, 1½" or 2" in diameter, more or less. These cutters 60 and 62 are mounted upon frame members 64 and 66. Each of the frame members 64 and 66 has attached thereto horn-like steering or guard members 70 and 72. These horn-like steering members 70 and 72 are used in guiding the cutters, the horn-like members engaging the stems of the plants to be cut and if a plant is offset from the row or the row is crooked, these horn-like members 70 and 72 align the cutters which are floatingly suspended, which mechanism will now be described.

Figure 3:
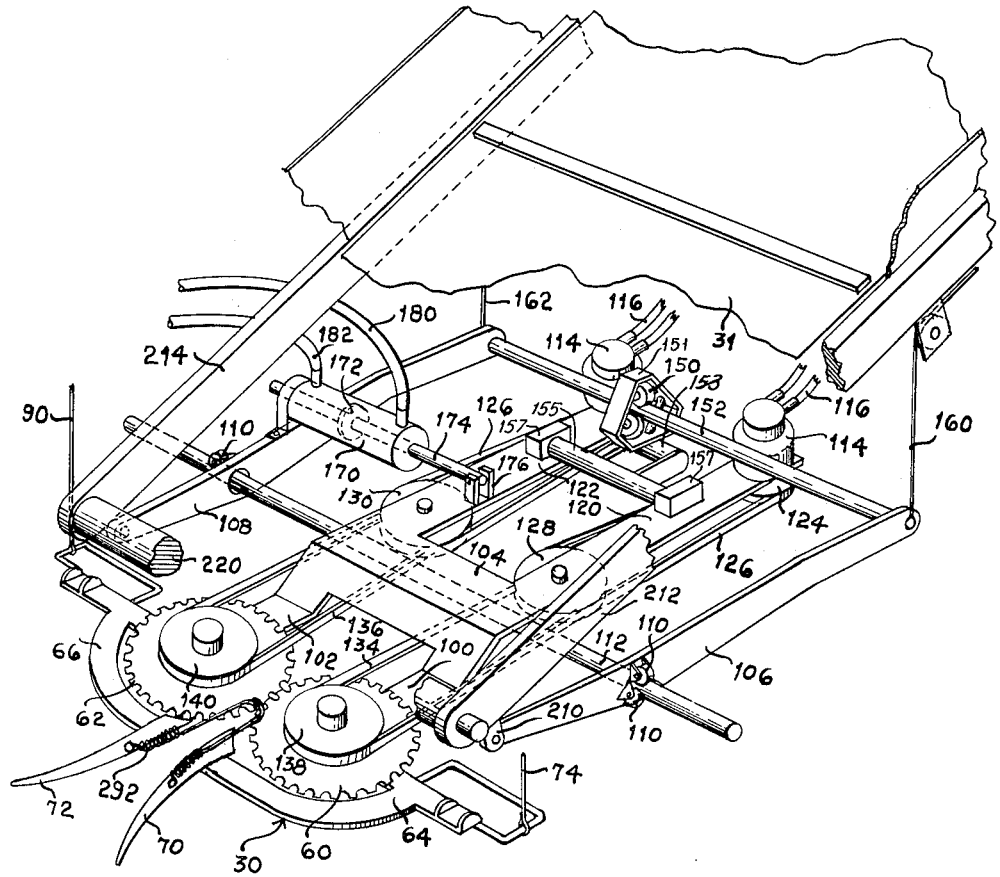
FIGURE 3 is a perspective view of the cutter and the driving mechanism therefor, with parts broken away and some parts shown in section.

By referring to FIGURE 3, it can readily be seen that the frame member 64 is suspended from a rod 74 attached to a spring 76 connected by a cable 78 trained over a pulley 80. The pulley 80 is rotatably mounted upon member 81 non-rotatably mounted upon the end of member 42. A lever 86 is rotatably mounted upon member 87 also non-rotatably mounted upon the end of member 42. The end of the cable 78 is attached to a member 84 that may be raised or lowered by the lever 86 provided with a suitable pawl (not shown) engaging the ratchet 88 fixedly mounted upon member 87. The frame member 66 is likewise suspended upon a rod or cable 90 connected to a spring (not shown), the tension of the springs being such that upon the proper adjustment of the lever 86 and the cables 78 and 90, any slight irregularity in the ground will cause the cutters to be raised and lowered, whereby the frame glides over the ground. In other words, the cutters are mounted upon a frame that practically floats.

The frame members 64 and 66 may be integral with or fixedly attached to the arms 100 and 102 of frame member 104 that is supported for transverse movement upon the pair of frame members 106 and 108 by a shaft 112. A plurality of rollers 110 provide supports for the ends of the shaft 112, so that this shaft, together with the frame member 104 and the cutters 60 and 62, may freely move transversely with respect to the frame members 106 and 108.

A pair of hydraulic motors 114 are mounted upon a second set of arms 120 and 122 integral with frame member 104. The motors are connected by suitable conduits 116 to the hydraulic system of the tractor. A hydraulic pump and hydraulic fluid is now built in and forms a part of the tractor. These motors 114 are provided with pulleys 124, only one of which has been shown, over which belts 126 are trained, driving pulleys 128 and 130 integral with or fixedly attached to a second set of pulleys driving the belts 134 and 136 used in driving pulleys 138 and 140. The pulley 138 is fixedly attached to the cutter 60 and the pulley 140 is fixedly attached to the cutter 62, so as to drive the two cutters substantially in unison. Rollers 150 are mounted in a frame 151 supported upon a cross bar 153 having the ends fixedly attached to a second cross bar 155 permanently attached to blocks 157, one of which is fixedly attached to the arm 120 and the other attached to the arm 122. The rear end of the frame member 106 is supported upon a pair of cables 160 and 162 that are connected to a lever 166 and a duplicate on the opposite side, not shown, for adjusting the angle or the tilt of the cutters and the parts supported thereby. The lever 166 is provided with a ratchet engaging a pawl mechanism, not shown, that holds the lever 166 in adjusted position.

Automatic steering mechanism

As stated before, the tractor may be steered manually by the steering wheel 26 connecting to a steering rod 26a. However, when cutting tobacco, it is preferable that the tractor and the cutter mechanism cooperate to steer the tractor along the row that is being cut. This has been accomplished by the use of a cylinder 170 provided with a piston 172 connected to a piston rod 174 having the end attached to a pair of brackets 176 mounted on the arm 122. This cylinder is connected to fluid conduits 180 and 182. These fluid conduits 180 and 182 are connected to the ends of a larger cylinder 190 provided with a piston that actuates the piston rod 192 connecting a lever 194 pivoted at 196 to a stationary arm 198. The opposite end of the lever 194 is pivotally attached to a link 200 connected to an arm 204 connected to the post 206 supporting the steering wheels. It can be readily seen that as the piston rod 192 is actuated by the fluid in the hydraulic system, the steering wheels are then steered either to the right or to the left, depending entirely upon the position of the frame supporting the cutters with respect to the frame members 106 and 108. It is to be noted that the frame members 106 and 108 are connected by links 210 to a pair of frame members 212 and 214. Only one of the links has been shown. By using a cylinder 170 that is smaller than the cylinder 190, the movement imparted to the piston rod 192 will be less than the movement imparted to the piston rod 174. The steering mechanism is such that the tractor gradually moves to align the guard members 70 and 72 with respect to the frame 42.

The frame members 212 and 214 support a roller 220 at the lower end thereof and a roller 222 at the upper or rear end. A canvas conveyor is supported upon the rollers 220 and 222, the roller 222 being driven by a belt 224 and a second belt 226 connected to a shaft 228 driven from the axle of the tractor.

Reel mechanism

The tobacco plants are subjected to two blasts of air supplied from conduits 240 and 244 from blowers 246 and 248 that may be driven by a motor 250 which may be either an electric motor or a hydraulic motor. In addition to the blasts of air from the conduits 240 and 244, a floating reel device is used. This floating reel device is so balanced that the reel per se droops downwardly until the lower portion of the reel contacts a tobacco plant which is easily lifted upwardly by a small force. This reel device includes a pair of belts 251, as clearly shown in FIGURE 4, having slats 252 attached to the belts and extending at right angles to the belts to span the distance between the belts. The belts, as clearly shown in FIGURE 4, are trained over the drums 254 and 270, each pivotally attached to the arms 256. These arms are pivotally attached to vertical arms 273, only one of which is shown. The arms 273 are permanently attached at their lower ends to the frame members 212 and 214. The belts are quite loose, so as to provide a considerable slack. The floating reel assembly, including the belts and slats, engages the top portion of the tobacco plants, automatically raising or lowering, to accommodate the changes in the height of the tobacco plants throughout the field. The forward ends of the belts pass over a drum or roller 254 which is pivotally mounted in link members 256 and 260 near the end thereof. This drum or roller 254 is driven by a belt 262 passing over a pulley (not shown) driven by the tractor. The rear ends of the belts are mounted upon an idler or roller 270 located near the pivot of the link members. The link members 256 and 260 are attached to a counter balanced arm 272 provided with a weight 274 that is adjustably mounted upon the arm 272, so that the forward ends of the belts are mounted on a floating support and the weight 274 is so adjusted that a slight force exerted upon the slats 252 will raise or lower the forward ends of the belts. Thus, if the tobacco is high, the front end of the belts will be raised, so as to barely touch the tobacco. These belts cooperate with the blasts of air to lay the tobacco plants down on the canvas conveyor or rubber belt conveyor in an orderly manner.

A pair of wire-like members 290 are attached to the horn-like members 70 and 72, so as to do two things. These wire-like guide members 290 are curved at the rear ends and straddle the stem or stalk of the tobacco plant to prevent the stalk of the tobacco plant upon being cut from being thrown aside by resting upon one of the cutters 60 or 62. The two rear ends of the wire-like members engage the lower end of the stem, so that as the reel engages the top of the plant, the plant is tipped down on the conveyor without the lower end of the plant being thrown to the right or to the left by one of the cutter wheels. As the plant tips down on the conveyor, the cut end of the stem clears the inner hook-like portions of the guide members 290. Each of these guide members is supported by a spring 292, so as to allow flexibility, so that when a heavy stalk is cut, the two members will spread sufficiently to permit the stalk to be engaged by the cutters. The ends of the springs are attached to the horn-like members 70 and 72.

In the modification disclosed in FIGURE 4, a "high boy" type of tractor has been shown, wherein there is a steering and driving wheel 304 and a pair of wheels 306, only one of which has been shown. The driving and steering wheel 304 is provided with a shield 302 which prevents the drive wheel from injuring the tobacco plants in the adjacent row. The rear wheels 306 are also provided with shields 308.

A power unit or engine 310 is mounted above the drive wheel 304. The frame structure consists of tubular structure 300, so as to provide a wide space between the two drive wheels 306 and a clearance for any suitable machinery. In this particular construction, the frame members 212 are suspended from the tubular structure 300 by braces 312 and 314, together with the cables 78 and 90. Instead of using two blowers, only one blower 320 is used, directing air in front of the reel drum 254. The operation of the mechanism is the same as that described in connection with the preferred embodiment.

*Mode of operation*

In starting the cutting operation, the tractor is driven to a position such that the cutters and the horn-like members 70 and 72 are aligned with the row of tobacco. Up to this time the tractor has been manually steered by the use of the steering wheel. As the cutter proceeds along the row, the tobacco is cut and laid down on the conveyor to be elevated towards the rear of the machine. Two persons standing on the platform 40 are preferably used in spudding the tobacco, that is, threading the tobacco stems by means of a spear-like member or spudder attached to the end of a lath, this spear-like member piercing through the center of the stems. The desired number of cut plants are placed on a lath and when the lath has been filled, the spudder is removed and the lath with the plants thereon is thrown on the ground where the plants are exposed to the sun, thereby removing some of the moisture content of the leaves, until towards evening, when the cut plants and the laths are loaded on a truck or wagon and hauled to the curing shed.

The speed of the tractor is generally so regulated that two persons can spud all of the cut plants. The speed of the tractor depends in part upon the spacing of the plants in a row and partly upon the aptness and speed at which the persons spudding the tobacco can spud the plants. Some persons work much faster than others. If a couple of fast spudders are used, the tractor can travel at a higher rate of speed.

The horn-like guide members 70 and 72 guide the cutters so that in the event the row is crooked or in the event a plant is slightly out of line, the cutters will be guided so as to cut the plant. At the same time, the movement of the frame supporting the cutters to the right or to the left will steer the tractor to the right or to the left. However, the steering mechanism is so designed that the tractor is steered gradually to change the direction of a row. This has been done so as to prevent hunting of the steering mechanism, that is, to prevent the steering wheel from swerving too far to the right or to the left. In actual use of the cutter, it has been found that it is absolutely unnecessary to use the manual steering device from one end of the row to the other end of the row. When it comes to the end of the row, the cutters are usually raised by means of the cable 78 and the lever 86, as best seen in FIGURE 2, and one of the spudders takes hold of the steering wheel to turn the tractor and the cutter to align the same with a succeeding row. When the tractor is aligned with the succeeding row, the cutters are lowered and the operation continues.

In the modification disclosed in FIGURE 4, the cutter may be used to cut any row through the field of tobacco, irrespective of whether or not any of the adjacent rows have been cut. In other words, this modification may be used to open a field, that is, to lay out the land or strip to be cut, irrespective of whether or not the adjacent rows have been cut.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A row crop harvesting machine mounted on a tractor having steering mechanism, said machine including a pair of rotary cutters lying substantially parallel to the ground and in close proximity thereto, frame means supporting the cutters, support means supporting said frame means upon said tractor and permitting sidewise movement of said frame means and the cutters, a pair of horn-like guide members attached to said frame means and projecting in front of the cutters, there being one horn-like member in front of each cutter, said horn-like guide members engaging the sides of the row crop to be cut and guiding the rotary cutters into alignment with the row to be cut, and means responsive to the sidewise movement of the horn-like guide members, said responsive means being connected to the steering mechanism for steering the tractor along adjacent portions of the row.

2. A row crop harvesting machine according to claim 1, wherein the means responsive to the sidewise movement includes a piston rod member and a cylinder member, one of said members being attached to said frame means, and means for mounting the other member in a fixed position with respect to the tractor, a second cylinder member and a second piston rod member, one of said second members being mounted on the tractor and the other second member being connected to the steering mechanism, and hydraulic conductors connecting the cylinders together at both ends so that the steering mechanism is actuated in response to sidewise movement of the horn-like guide members.

3. A machine for harvesting tobacco plants planted in rows, said machine being mounted upon and driven by a tractor having steering mechanism, said machine comprising frame means pivotally attached to the tractor, a support frame, suspension means suspending the support frame upon said frame means, suspension means allowing lateral movement of said support frame with respect to said frame means, cutting means mounted on the support frame for severing the tobacco plants, guide means mounted on the support frame and projecting forwardly from the cutting means for moving the support frame laterally in response to lateral displacement of the row, a conveyor mounted on said support means to the rear of the cutting means, and a floating reel mounted on said support means for tipping the tobacco plants towards the cutting means and tipping the severed plants upon the conveyor.

4. A machine for harvesting tobacco plants planted in rows, said machine being mounted upon and driven by a tractor having steering mechanism, said machine comprising frame means pivotally attached to the tractor, a support frame, suspension means suspending the support frame upon said frame means, said suspension means allowing lateral movement of said support frame with respect to said frame means, cutting means mounted on the support frame for severing the tobacco plants, guide means mounted on the support frame and projecting forwardly from the cutting means for moving the support frame laterally in response to lateral displacement of the row, a conveyor mounted on said support means to the rear of the cutting means, a floating reel mounted on said support means for tipping the tobacco plants towards the cutting means and tipping the severed plants upon the conveyor, and means responsive to the lateral movement of the support frame connecting the support frame to the steering mechanism on the tractor for steering the tractor along the row of tobacco plants being cut.

5. A harvesting machine for cutting rows of tobacco, said machine being driven by and attached to a tractor having steering mechanism, said harvesting machine including: a frame structure adjustably attached to the tractor, said frame structure including a horizontal frame member, a first pair of frame members pivotally mounted on said horizontal frame member, a second pair of frame members pivotally attached to said first pair of frame members, means connecting the second pair of frame members in spaced relation to one another, a cutter assembly support shaft supported for reciprocatory transverse movement by said second pair of frame members, a cutter assembly mounted upon said support shaft, a floating reel assembly, a pair of reel assembly support arms attached to the first pair of frame members mounting said reel assembly above the cutter assembly, said reel assembly moving the tobacco rearwardly while being cut and thereafter, and blower means mounted in front of the floating reel assembly directing a blast of air aiding the floating reel assembly in moving the tobacco plants rearwardly while being cut and thereafter.

6. A harvesting machine according to claim 5, wherein the first pair of frame members support a conveyor for elevating the cut tobacco plants from the cutter assembly upwardly and rearwardly.

7. A harvesting machine according to claim 5, wherein the first pair of frame members support a conveyor for elevating the cut tobacco plants from the cutter assembly upwardly and rearwardly and wherein a platform is mounted upon the tractor to the rear of the conveyor providing standing space for operators to spud the cut tobacco plants.

8. A harvesting machine according to claim 5, wherein the cutter assembly includes a cutter mounting frame, power driven cutter means mounted upon the cutter mounting frame, and a pair of horn-like guards mounted on the cutter mounting frame and in front of the cutter means for shifting the cutter assembly laterally with the second shaft so as to guide the cutter assembly along the row being cut.

9. A harvesting machine according to claim 5, wherein the cutter assembly includes a cutter mounting frame, a power driven cutter means mounted upon the cutter mounting frame, a pair of horn-like guards mounted on the cutter mounting frame and in front of the cutter means for shifting the cutter assembly laterally with the second shaft so as to guide the cutter assembly along the row being cut, and means attached to the cutter assembly for steering the tractor in response to lateral movement of the cutter assembly.

10. A harvesting machine according to claim 5, wherein the first pair of frame members are mounted for tilting adjustment upon the frame adjustably attached to the tractor.

11. A harvesting machine according to claim 5, wherein the outer end of the adjustably mounted frame pivotally attached to the tractor is supported upon a ground wheel and wherein said adjustably mounted frame may be raised or lowered with respect to said ground wheel.

12. A harvesting machine according to claim 5, wherein the second pair of frame members may be tilted to various angles to thereby change the angle of the cutter assembly.

13. A harvesting machine according to claim 5, wherein the cutter assembly includes a cutter mounting frame member mounted upon said shaft, said cutter mounting frame member supporting power driven cutters, and wherein the portion of said cutter mounting adjacent the cutters is resiliently supported to allow the cutters to follow the contour of the ground.

14. A row crop harvesting machine for harvesting vegetation, said machine including a support structure, a pair of motor driven rotary cutters, a cutter support frame supported by said support structure and mounting said rotary cutters, a floating reel mounted by said support structure above the cutters, a conveyor supported by said support structure extending rearwardly from the cutters, a pair of flexible guard members attached to said cutter support frame and extending over the cutters to hold vegetation cut thereby until said reel tips the cut vegetation upon the conveyor.

15. A row crop harvesting machine for harvesting vegetation, said machine including a support structure, a pair of motor driven rotary cutters, a cutter support frame supported by said support structure and mounting said rotary cutters, a floating reel mounted by said support structure above the cutters, a conveyor supported by said support structure extending rearwardly from the cutters, a pair of flexible guard members attached to said cutter support frame and extending over the cutters, each of said guard members including a wire-like member having one end attached to said cutter support frame, an adjacent portion being coiled, the coiled portion having a straight portion merging into a curved end, the straight portion extending along the cutters to prevent the cut stems of the vegetation moving sidewise and the curved end tripping the cut vegetation to aid said reel to tip the vegetation upon said conveyor.

References Cited by the Examiner
UNITED STATES PATENTS

| | | | |
|---|---|---|---|
| 2,329,596 | 9/43 | Dalimata | 56—219 |
| 2,454,063 | 11/48 | Irvine | 56—219 |
| 2,509,914 | 5/50 | Goodwine | 180—79.1 |
| 2,696,069 | 12/54 | Hawkins | 56—27.5 |
| 2,836,950 | 6/58 | Anderson | 56—27.5 |
| 2,933,875 | 4/60 | Meyer et al. | 56—27.5 |
| 2,981,355 | 4/61 | Rabuse | 180—79.1 |
| 3,079,744 | 3/63 | Newswanger | 56—27.5 |

T. GRAHAM CRAVER, *Primary Examiner.*

CARL W. ROBINSON, RUSSELL R. KINSEY,
*Examiners.*